Dec. 16, 1941.　　　　I. STERN　　　　2,266,285
REMOVABLE DENTAL BRIDGE ATTACHMENT
Filed Aug. 29, 1940　　　2 Sheets-Sheet 1
FIG.1.
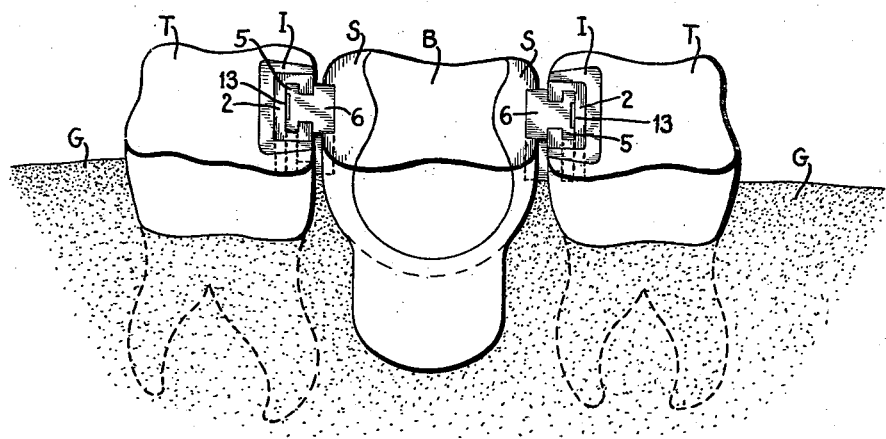
FIG.2.
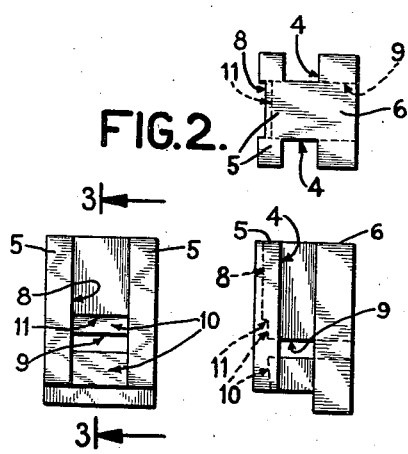
FIG.3.
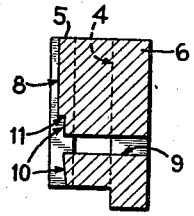
FIG.4.
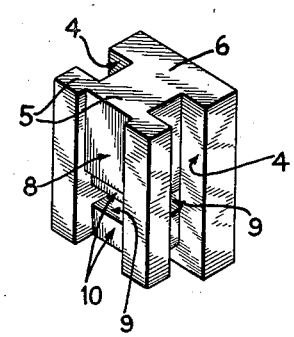
FIG.5.
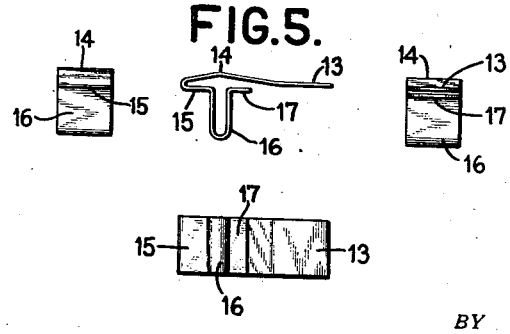
FIG.6.
INVENTOR.
ISIDORE STERN
BY
James C. Ledbetter
ATTORNEY.

Dec. 16, 1941.  I. STERN  2,266,285
REMOVABLE DENTAL BRIDGE ATTACHMENT
Filed Aug. 29, 1940  2 Sheets-Sheet 2

INVENTOR.
ISIDORE STERN
James C. Ledbetter
ATTORNEY.

Patented Dec. 16, 1941

2,266,285

UNITED STATES PATENT OFFICE 2,266,285

REMOVABLE DENTAL BRIDGE ATTACHMENT

Isidore Stern, New Rochelle, N. Y., assignor to I. Stern & Co., Inc., New York, N. Y., a corporation of New York Application August 29, 1940, Serial No. 354,679

7 Claims. (Cl. 32—5)

This invention relates to dental bridgework and more particularly to a new removable dental bridge attachment for use in constructing bridges adapted to be removably supported between natural teeth acting as pier supports in dental restorative work.

In one class of dental restorative work employing a removable bridge, it is the practice to mount denture receiving sockets or boxes on or within a pair of inlays fitted into spaced sound or natural teeth and employ them as pier teeth to support the bridge across the edentate space to be restored, and a pair of denture attachments forming part of the bridge are adapted to removably fit into the pier tooth receiving boxes.

Removable denture attachments now available to the dental trade serve the purpose in one way or another in making removable bridgework, but it is an object of this invention to improve generally thereon and provide the dental profession with a new type of removable attachment having a separable retaining-spring means which affords a wider range of latitude in working on the attachment in connection with constructing a bridge to meet the requirements of each dental restorative case.

In other words, a certain amount of fitting and other work is required in adapting a factory-made attachment to a particular patient's dental bridge and this includes, among other things, heating the attachment for soldering it to the bridge which spans the edentate space between two natural teeth in one's mouth to be restored by an artificial and removable bridge; and a purpose of the invention is to produce an attachment which is convenient for the dental mechanic to work upon without damaging the attachment and its retaining spring in the course of producing the bridgework for a patient.

A further object is to produce a removable bridgework attachment comprising a denture body member fitted with a yieldable pressure spring which compensates for wear and loss of retentive friction, so as to maintain a close fit between the bridge and pier teeth, and wherein the spring is easily separable from the attachment body so the latter may be worked upon, as by soldering it to the bridge, and thereafter the spring is restored to operative position in the body after all work is finished, thus not only having the spring out of the way during the work but avoiding all likelihood of damaging the delicate compensating spring or impairing its original temper and spring tension.

A further object is to produce a removable denture attachment having a separable or detachable spring as aforesaid which, after all mechanical work is completed on the bridge, can be mounted in and positively locked to the attachment body so as to prevent said spring from becoming detached or loosened due to normal wear and use of the bridgework.

It is also an object to produce a removable denture attachment adapted to have a close sliding frictional fit with its stationary receiving box or enclosing socket carried by the inlay of the natural tooth acting as a pier support for the bridge and characterized by the fact that surface engagement is complete throughout the contacting surface area of the box and the body constituting the removable attachment.

A further object is to produce a denture attachment having compensating frictional engagement and yielding pressure contact between the removable attachment and its stationary receiving box, from the very beginning of the entry of said attachment into said box, and particularly good contact near the bottom of the box, these features distinguishing from those known types of dentures which only attain complete area engagement after being fully inserted or which on the other hand only exert their retentive contact near the top of the box.

Also, it is an important object to provide such a compensating spring which constitutes convenient means for refitting a new spring to a bridge after long use, in the event the original spring has become old and broken or otherwise impaired, with the result that this invention enables the dentist to recondition a bridge after long service without the necessity of unsoldering the denture attachment from the bridgework and thus becoming involved in a major refitting of the entire assembly.

A further object is to produce a new form of compensating spring for removable bridgework and suited to the purposes at hand and which, in conjunction with a new form of spring-fitted body member, results in a denture attachment which is durable and adapted to long life and economy in its repair should the owner damage either the bridge or attachment.

With the foregoing and other objects in view, the invention relates to the new construction and combination of parts arranged according to the novel principles and mode of operation and assembly as herein explained, as well as shown in the accompanying drawings illustrating preferred examples or forms of the invention, with its several uses and advantages, wherein:

The drawings show the denture attachment greatly enlarged in scale for clarity and to facilitate an understanding thereof.

Figure 1 is a schematic or side perspective view of a removable dental bridge mounted between two natural pier teeth to restore the edentate space and showing the use of this new denture attachment in connection therewith.

Figure 2 is a cluster three-way view of the body of the attachment, showing the front, side and top thereof, the spring having been removed by a dental mechanic preparatory to his work on the body part in connection with soldering it integrally to the edentate-space bridge S, as shown in Figure 1, after which the spring is to be replaced in the body.

Figure 3 shows a longitudinal sectional view of the body of the attachment as taken on the line 3—3.

Figure 4 shows a perspective view of the body.

Figure 5 is a cluster view of the yieldable compensating spring detached from the body and illustrated four ways, namely, front end, side elevation, rear end, and underneath view thereof.

Figure 6 is a perspective view of the separable spring.

Figure 7:
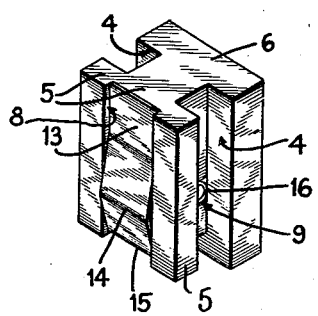
Figure 7 is a perspective view of the complete attachment, comprising the assembled body and spring, as manufactured for the trade.

A denture attachment of this character is made of precious metal and comprises three parts, namely, the receiving box or socket, the head or body member removably inserted into the box, and the compensating spring carried with the body for sliding contact against an inside wall of the box to enforce a close frictional fit between the body and the box. It is the combination of the new body and its novel spring and mode of arrangement with the receiving box of old form to which this invention more particularly relates.

Referring first to Figure 1 for a general understanding of the utility of the invention, there are shown two natural teeth T utilized by the dentist as pier supports for a bridge B to restore the edentate space left in the gum margin G of the patient's mouth due to the loss of one or more teeth. Each pier tooth T is first prepared by fitting it with an inlay I of precious metal in the usual way. A bridge B of suitable form is supported between the two pier teeth T. Such a bridge may comprise one or more artificial teeth carried in a saddle S of precious metal. The saddle fits across and lightly bears or rests upon the gum G and extends upwardly not only to embrace the bridgework B but to also provide a suitable metal structure adjacent the two inlays I by which to solder my attachment to each end of any known form of bridge.

Each inlay I contains a socket or box 2 in the form of a pocket open at the top and closed at the bottom, as known in the art, to removably receive the attachment. The conventional box 2 is generally rectangular in cross section and has a vertically disposed slot or opening facing the bridge B. The inlay I and its box 2 are made a part of the natural tooth T in the usual way by the dentist and are prepared to removably receive the bridgework B. In some cases, where it is not desirable to fit an inlay into the sound pier teeth, as shown in Figure 1 merely as an example, the box may be secured thereto by a band or other known means.

The construction and utility of this new denture attachment is shown in the successive views of the drawing. The body member of the attachment may comprise a rectangular shaped precious metal part somewhat longer than its greater cross-sectional dimension. It is made with opposite longitudinal grooves 4 vertically formed in its sides, which in effect form the body into a head portion 5 adapted to be removably received into the pier-tooth box 2 and a shank portion 6 adapted to be soldered to the bridge saddle S. The grooves 4 effect a sliding fit with the edges of the slot forming an opening in the front wall of the box 2 and thus the shank portion 6 is outside of the box.

The head 5 is provided with a longitudinal channel 8 extending vertically downward from the upper end thereof. Also, a socket 9 extends at right angles from the channel forwardly past the grooves 4 and into or through the shank 6. Hence, the socket 9 may extend from one face of the body through to the opposite face thereof. The socket 9 may be made proximate the lower end of the body or preferably below the center thereof. The socket 9 may also open into the side grooves 4 as an expedient in producing the small body part and is shown of rectangular shape in cross section.

The shallow channel 8 is gradually increased in depth at the lower end of the body by being sloped downwardly and into the head 5, as indicated at 10, and thus extends back into the head 5 at a slight angle to the longer upper channel portion 8. Thus the channel 8, 10 comprises a stepped formation with the shallow portion 8 and deeper angular portion 10. The shallow and deeper channel portions join just above the socket 9 to form a shoulder 11 as shown. This channel and socket formation receives and holds the frictional compensating spring as next described, the illustrated spring being one of the better forms selected to perform the requisite functions. However, other types and shapes of the spring may be used.

A precious metal leaf spring is fashioned to fit the channel 8, 10 and socket formation 9 of the head portion 5 and comprises a long flat spring end 13 adapted to lie yieldingly within the shallow channel, the spring being slightly thinner than the depth of said shallow channel. The spring 13 includes a bulging pressure portion 14 in the form of a double wedge or cam adapted to overlie the deeper channel portion 10. The spring is bent back upon itself at 15 underneath its bulge 14 and is then curled or deformed at right angles to the plane of the flat spring portion 13 to produce a spring lobe or resilient shank portion 16 which terminates in a short end 17 in the plane of the spring portion 15 and parallel with the longer spring end 13.

The leaf spring thus formed is initially longer than the body but attains a length about equal thereto by deforming it as shown. The spring fitted to the body is shown in the assembly views, with the lobe 16 disposed in the socket 9. This places the short spring end 17 in abutting relation against the shoulder 11, with the longer free end 13 lying resiliently within the shallow channel 8, and the short bent-back spring portion 15 resting over the angular channel 10 at the bottom of the head 5. Such an arrangement provides freedom or clearance between the spring portion 15 and the bottom of the deeper channel 10 sloping away from the spring at the lower end of the body member. The spring is readily removable or detachable from the head 5 of the body, but is satisfactorily retained therein by reason of the pressure and frictional engagement between the lobe 16 and the socket 9.

Figure 8:
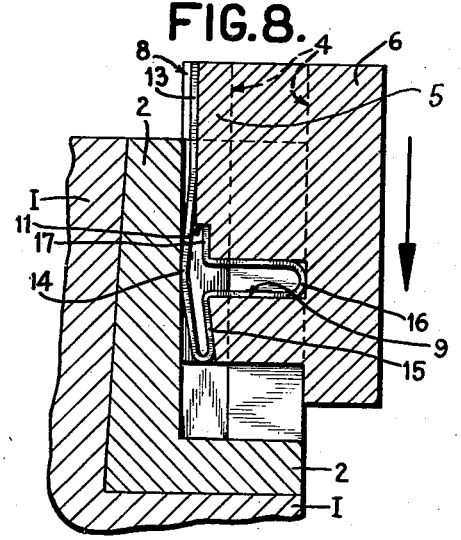
Figure 8 is a longitudinal section of the denture attachment in the act of being inserted (in direction of arrow) and only part-way into its pier tooth receiving box.
Figure 10:
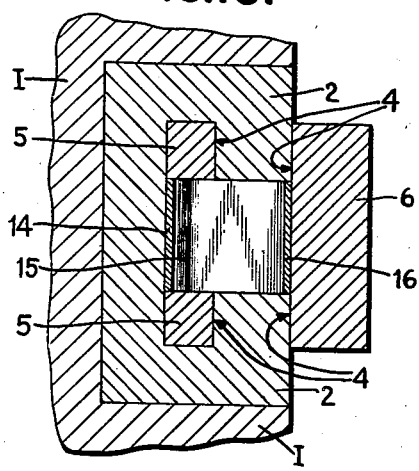
Figure 10 is a horizontal section of the line 10—10.
Figure 9:
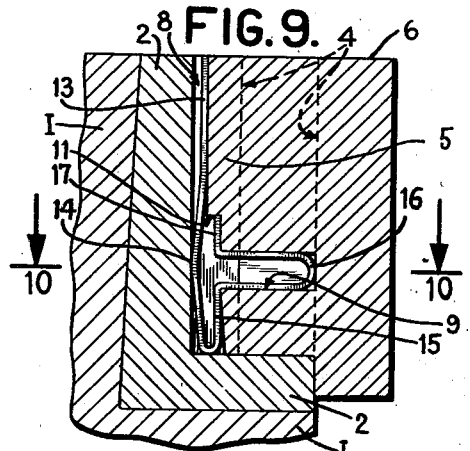
Figure 9 is a longitudinal section of the attachment inserted all the way into its receiving box and retained therein.

The succeeding views show the assembly of the spring and body member, as well as its manner of insertion into and removal from the pier tooth box 2 acting as an anchorage for the bridge. Figure 8 shows the removable denture attachment being inserted into the box 2 as indicated by the direction arrow, while Figure 9 shows it in final position.

It is noted that the box 2 may be formed with a slot (see Figure 1) extending vertically in the outer wall thereof facing the bridge saddle S. This conventional box form receives the attachment body, the grooves 4 of which register with the slot in the box 2. The frictional engagement between the spring portion 14 and rear or inner wall of the box provides a pressure and frictional contact which removably holds the attachment in service position and mounts the bridge B between its two pier teeth T.

Figure 11:
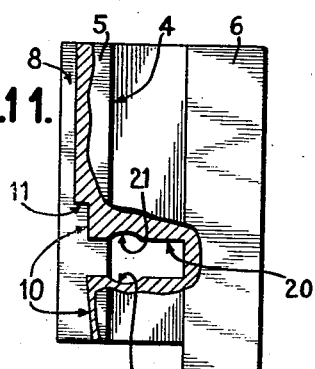
Figure 11 is a side view of a modified form of body member, having means for positively locking the compensating spring therein.
Figure 12:
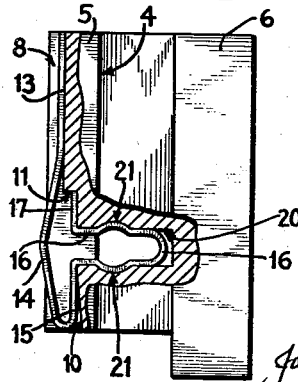
Figure 12 is a side view in broken-away section of the spring finally fitted into the attachment body of Figure 11 and permanently secured therein, by which the spring is insured against inadvertent loosening and detachment in a long period of use of the bridgework.

Figures 11 and 12 show a modified form of the invention, and the same reference numbers and description heretofore given are used to indicate the parts and their coaction, except for the additional feature now described. The spring and body member of Figures 11 and 12 are essentially the same in structure and mode of assembly as heretofore described, except for an additional improvement in the body socket (differing in form from the socket 9), said added feature providing means for positively anchoring the spring in the body to eliminate the separable or detachable spring feature once the bridge is completed and the patient starts its use.

A modified form of socket 20 is made with opposite arcuate recesses 21 just behind the channel 10. The spring lobe 16, say of the same shape as heretofore described, is set into this improved form of socket 20, 21 with the two sides of the lobe lying across the notched recesses 21, and the mechanic making the bridge uses a small punch or needle placed into the lobe 16 between its two sides and deforms them into the recesses 21. The lobe 16 thus swedged into the socketed means 20, 21 provides a positive anchorage between the spring and the body. Such modified mode of assembly prevents the accidental loosening of the spring from its seat in the body when the bridge B is removed from one's mouth for cleaning and other purposes.

This modified body construction (Figures 11 and 12) having the improved socket recesses 21 may be preferred by some dentists over the straight form of socket 9 and spring lobe 16. A dentist can remove the expanded lobe spring from the socket 20 so as to recondition the bridge by installing a new spring if need be, but the owner of the bridge cannot readily remove it. In fact, the spring is of such design and construction that replacement is most unlikely. This is especially true since the spring is not heated during the bridge construction, including the soldering work on the saddle S, as well as other parts, all of which means that the spring retains its original temper from the beginning of use, so that need for replacement thereof is remote from either that standpoint or likely breakage.

It will be noted that the design and construction of this denture attachment is such that the frictionally-engaging spring portion 14, which secures the bridge attachment within the box 2, is located near the lower end of the attachment. When the attachment is first inserted into the box 2 it begins frictional engagement from the inception of entry, and once the attachment is bottomed in the box it follows that the yieldable friction retentiveness between the attachment and box is established near the bottom portion of the latter. This avoids the undesirable feature of frictional engagement existing only at or near the upper end of the box. Not only is this bottom frictional contact holding feature important, but the particular design and construction of the body and spring is such that the entire front face of the attachment, adjacent the grooves 4, is urged into sliding contact with the inner surface of the box wall.

When the attachment is first started downwardly in its box (direction of arrow Figure 8), it follows that the clearance underneath the spring portion 15, at the angular deep channel 10, permits the double wedge portion 14 to yieldingly give inwardly toward said deep channel, thus facilitating the start of the denture bridgework into its two inlay boxes 2 carried in the spaced pier teeth T. The corner formation of the short spring end 17 at the lobe 16, as well as the bent back spring portion 15, are both supported by the corner walls of the two forms of sockets 9 and 20 shown. The spring stress and movement is therefore well distributed and the spring will endure a long period of use.

This invention is presented to fill a need for a useful removable dental bridge attachment. It is understood that various modifications in construction, operation and use, may and often do occur to those skilled in the art, especially after benefitting from the teachings of an invention, and that this disclosure and appended claims are descriptive of the principles but not limited to the present embodiment of the invention.

What is claimed is:

1. A denture attachment for use in connection with bridgework of the removable type having a pier tooth inlay support in the form of a box, comprising a body adapted to be removably carried by the box, a channel formed longitudinally in the body, a socket formed deep into the body behind and opening into the channel, a spring part thinner than the depth of the channel and resiliently disposed therein, a portion of the spring part bulged outwardly beyond the depth of the channel and adapted to yieldingly engage the inner surface of the box to produce a close sliding fit between said box and body, and a resilient lobe portion deformed into the spring part and projecting into the socket to retain said spring part in the body.

2. A denture attachment for use in connection with bridgework of the type having a pier tooth inlay support in the form of a box, comprising a body adapted to be removably carried by the box, said body formed generally rectangular in cross section and approximately longer than its cross sectional dimension, a channel formed longitudinally in the body, a socket formed deep into the body behind and opening into the channel substantially at right angles thereto, a leaf spring somewhat longer than the channel resiliently disposed therein and adapted to yieldingly engage the box to produce a close sliding fit between said box and body, and a lobe portion curled into the spring and disposed in the deep socket to detachably mount the spring in the body, said lobe portion utilizing that portion of the spring which exceeds the length of the channel and thereby reducing the spring to an overall length approximately equal to that of the body.

3. A denture attachment for use in connection with bridgework of the type having a pier tooth inlay support in the form of a box, comprising a body adapted to be removably carried by the box, said body formed generally rectangular in cross section and approximately longer than its cross sectional dimension, a channel formed longitudinally in the body from end to end thereof, a socket formed deep into the lower portion of the body behind and opening into the channel substantially at right angles thereto, a leaf spring resiliently disposed within the channel and having a portion thereof adapted to resiliently engage the box to produce a close sliding fit between said box and body, and another portion of the spring being bent back upon itself underneath the box engaging portion aforesaid and extended into the socket to detachably hold the spring and body in assembled relation.

4. A denture attachment for use in connection with bridgework of the type having a pier tooth inlay support in the form of a box, comprising a body adapted to be removably carried by the box, said body formed generally rectangular in cross section and approximately longer than its cross sectional dimension, a channel formed longitudinally in the body and being shallow at the upper end of said body and deeper at its lower end, a socket formed in the body behind and opening into the deeper portion of the channel and substantially at right angles thereto, a leaf spring resiliently disposed in the channel and adapted to yieldingly engage the box to effect a close sliding fit between said box and body, a portion of the spring bent back upon itself within the deeper channel portion, and a lobe portion forming a part of the bent back spring portion, said lobe portion being disposed within the socket to detachably mount the spring in operative relation with the body.

5. A removable dental bridge attachment comprising, in combination, a body member of elongated form, said body member being provided with a channel extending from end to end thereof, the channel being formed of a shallow and deep portion, the channel also having a shoulder formed at the juncture of the shallow and deep portions, said body also being provided with a socket which extends from the channel transversely into said body; and a spring resiliently lying within the channel with one end thereof free in the shallow portion, while the other end is bent back under itself and resiliently rests within the deep channel portion as well as projecting outwardly therefrom beyond the surface of the body, the bent back spring end engaging the shoulder aforesaid, and a lobe fashioned in the bent back spring portion extending into the socket of the body.

6. A removable dental bridge attachment comprising, in combination, a body member of elongated form, said body member being provided with a channel extending from end to end thereof, the channel being formed of a shallow and deep portion, said body also being provided with a socket which extends from the channel transversely into said body; the deep channel portion being formed at the lower end of the body member and gradually increasing in depth downwardly from the socket aforesaid; and a spring resiliently mounted within the channel, including an upper spring portion resting freely in the shallow channel portion, a lower spring portion bent back upon and under itself forming a double spring means resting freely within the deeper channel portion, whereby clearance exists between the lower end of the spring and bottom of the channel by reason of the gradually increased depth aforesaid, a double wedge formation fashioned into the lower spring end and extending resiliently outward from the surface of the body member, and a curled formation fashioned into the bent back spring portion projecting into the socket aforesaid.

7. A removable denture attachment comprising, in combination, a body of elongated form, having a longitudinal channel formed in one face thereof, and a socket extending laterally from the channel toward the other face thereof opposite the channel, said socket constituting an opening which is generally rectangular in cross section; a pair of arcuate recesses notched into the socket, one above the other; a spring somewhat longer than the body resiliently mounted within the channel, a portion of the spring bent back upon itself and extended laterally into the socket away from the channel across one recess and curled forwardly toward the channel across the other recess, and the spring portions lying over the recesses adapted to be swedged into said recesses.

ISIDORE STERN.